(12) United States Patent
Levi

(10) Patent No.: US 7,853,936 B2
(45) Date of Patent: Dec. 14, 2010

(54) COMPILATION OF NESTED REGULAR EXPRESSIONS

(75) Inventor: Amir Levi, Ramat Hasharon (IL)

(73) Assignee: SAP Portals Israel Ltd., Ra'Anana (IL)

( * ) Notice: Subject to any disclaimer, the term of this patent is extended or adjusted under 35 U.S.C. 154(b) by 1547 days.

(21) Appl. No.: 11/055,266

(22) Filed: Feb. 10, 2005

(65) Prior Publication Data

US 2006/0179054 A1 Aug. 10, 2006

(51) Int. Cl.
G06F 9/45 (2006.01)
(52) U.S. Cl. .................. 717/143; 715/234; 707/999.006
(58) Field of Classification Search .................. None
See application file for complete search history.

(56) References Cited

U.S. PATENT DOCUMENTS 6,662,342 B1 * 12/2003 Marcy .................. 715/227

OTHER PUBLICATIONS

Cameron, Robert D., REX: XML Shallow Parsing with Regular Expressions, Markup Languages: Theory and Pratice vol. 1, No. 3, Summer 1999 pp. 61-88, Retrieved on [Aug. 11, 2009], Retrieved from the Internet: URL<ftp://fas.sfu.ca/pub/cs/tech reports/1998/CMPT1998-17.html.*
Ludascher et al, A Transducer-based XML Query Processor, 2002, pp. 227-238, Retrieved on [Jul. 16, 2010] Retrieved from the Internet: URL<http://delivery.acm.org/10.1145/1290000/1287390/p227-ludascher.pdf?key1=1287390&key2=7935829721&coll=Guide&dl=Guide&CFID=95051968&CFTOKEN=58888253>.*
Hosoya et al Regular Expression Pattern Matching for XML, JFP 13 (6), Nov. 2003, pp. 961-1004, Retrieved on [Jul. 16, 2010] Retrieved from the Internet: URL<http://repository.upenn.edu/cgi/viewcontent.cgi?article=1159&context=cis_papers>.*
http://www.w3.org/DOM, Jan. 30, 2007.
http://www.sap.com/solutions/index.epx, Jan. 30, 2007.
http://www.w3.org/TR/2004/REC-xml-20040204, Jan. 30, 2007.

* cited by examiner

Primary Examiner—Tuan Q Dam
Assistant Examiner—Cheneca Smith
(74) Attorney, Agent, or Firm—Buckley, Maschoff & Talwalkar LLC

(57) ABSTRACT

A method for string matching includes accepting an input regular expression comprising one or more nested references to respective referenced regular expressions. The nested references in the input regular expression are replaced with the respective referenced regular expressions, so as to provide a modified regular expression that does not contain nested references. The modified regular expression is matched to a target string.

21 Claims, 2 Drawing Sheets

COMPILATION OF NESTED REGULAR EXPRESSIONS

FIELD OF THE INVENTION

The present invention relates generally to automated parsing of character strings, and particularly to methods and systems for string processing using regular expressions.

BACKGROUND OF THE INVENTION

Enterprise software tools are used by many organizations as common platforms for linking the different applications and data structures of the organization. For example, SAP AG (Walldorf, Germany) offers the "SAP Enterprise Portal," a product enabling various knowledge-management and collaboration functionalities for managing the different IT resources of the organization. Additional information regarding this product is available at www.sap.com/solutions/netweaver/enterpriseportal.

Some of the functions provided by enterprise software tools require the processing of XML documents. XML (Extensible Markup Language) is a simplified version of Standard Generalized Mark-Up Language (SGML), designed initially for Web documents. XML allows designers to create their own customized markup languages, enabling the definition, transmission, validation, and interpretation of data between applications and between organizations. XML is a formal recommendation of the World Wide Web Consortium (W3C). Additional information regarding XML in general, and particularly the XML 1.0 standard, is available at www.w3.org/TR/2004/REC-xml-20040204/.

Processing an XML document typically comprises parsing it using an XML parser. Several XML parsing methods are known in the art, and several commercial XML parsers are available in the market. The XML parser typically produces a DOM (Document Object Model), which is a logical representation of the document in a hierarchical tree form. The DOM is a platform-independent and language-independent interface that allows programs and scripts to dynamically access and update the content, structure and style of the document. The DOM programming interface standards are defined by the World Wide Web Consortium (W3C). Additional information regarding the DOM standards is available at www.w3.org/DOM.

The above-mentioned XML standard makes extensive use of regular expressions (REs). A regular expression is a template or a pattern that can match various text strings. The pattern is represented in terms of characters and meta-characters. The meta-characters operate as "wildcards," allowing different groups of characters to match a single template. Regular expressions may be nested, i.e., they may contain nested references, pointing to or including other regular expressions. For example, the XML 1.0 standard comprises 84 regular expression definitions, out of which 67 are nested.

SUMMARY OF THE INVENTION

Many programming languages—particularly scripting languages—do not provide facilities for automatic matching of nested regular expressions to a string. For example, although both Javascript® and VBScript® can parse self-contained regular expressions, they do not provide support for nested regular expressions. This shortcoming limits the usefulness of these scripting languages in parsing strings (i.e., documents) created in structured languages such as XML, which commonly use nested regular expressions.

Embodiments of the present invention provide methods for "de-nesting" nested regular expressions, i.e., converting nested regular expressions into equivalent strings or self-contained (non-nested) regular expressions. These methods use an iterative process for removing the nested references from a regular expression. After converting the nested regular expressions in this manner, it is then possible to use the converted expressions in parsing strings, such as XML documents, by applying simple "string match" commands that are available in common scripting languages.

There is therefore provided, in accordance with an embodiment of the present invention, a method for string matching, including accepting an input regular expression that includes one or more nested references to respective referenced regular expressions, replacing the nested references in the input regular expression with the respective referenced regular expressions, so as to provide a modified regular expression that does not contain nested references, and matching the modified regular expression to a target string.

In an embodiment, replacing the nested references includes representing the input regular expression using a character string, in which each of the nested references is represented by a pointer including at least one dedicated pointer character followed by a reference name. Additionally, replacing the nested references includes compiling the character string to generate the modified regular expression.

In another embodiment, replacing the nested references includes storing a cached regular expression corresponding to a first occurrence of a nested reference, and replacing a second occurrence of the nested reference, subsequent to the first occurrence, with the cached regular expression.

There is additionally provided, in accordance with an embodiment of the present invention, a method for parsing a document that includes data structures conforming to a document specification, the method including accepting a set of rules defining valid data structures in terms of a regular expression including one or more nested references to respective referenced regular expressions, replacing the nested references in the regular expression with the respective referenced regular expressions, so as to provide a modified regular expression that does not contain nested references and a modified set of rules including the modified regular expression, and parsing the document accordingly to the modified set of rules.

In an embodiment, parsing the document includes producing a document object model (DOM) corresponding to the document. In another embodiment, the document specification includes an Extensible Markup Language (XML) specification. In yet another embodiment, parsing the document includes applying to the document a parsing program written in a script language.

There is also provided, in accordance with an embodiment of the present invention, apparatus for string matching, including an interface, which is arranged to accept an input regular expression that includes one or more nested references to respective referenced regular expressions, a regular expression processor, which is arranged to replace the nested references in the input regular expression with the respective referenced regular expressions, so as to provide a modified regular expression that does not contain nested references, and a parsing processor, which is arranged to match the modified regular expression to a target string.

There is further provided, in accordance with an embodiment of the present invention, apparatus for parsing a document that includes data structures conforming to a document specification, the apparatus including an interface, which is arranged to accept a set of rules defining valid data structures in terms of a regular expression including one or more nested references to respective referenced regular expressions, a regular expression processor, which is arranged to replace the nested references in the regular expression with the respective referenced regular expressions, so as to provide a modified regular expression that does not contain nested references and a modified set of rules including the modified regular expression, and a parsing processor, which is arranged to parse the document accordingly to the modified set of rules.

There is also provided, in accordance with an embodiment of the present invention, a computer software product for string matching, the product including a computer-readable medium in which program instructions are stored, which instructions, when read by a computer, cause the computer to accept an input regular expression including one or more nested references to respective referenced regular expressions, to replace the nested references in the input regular expression with the respective referenced regular expressions, so as to provide a modified regular expression that does not contain nested references, and to match the modified regular expression to a target string.

There is additionally provided, in accordance with an embodiment of the present invention, a computer software product for parsing a document that includes data structures conforming to a document specification, the product including a computer-readable medium in which program instructions are stored, which instructions, when read by a computer, cause the computer to accept a set of rules defining valid data structures in terms of a regular expression including one or more nested references to respective referenced regular expressions, to replace the nested references in the regular expression with the respective referenced regular expressions, so as to provide a modified regular expression that does not contain nested references and a modified set of rules including the modified regular expression, and to parse the document accordingly to the modified set of rules.

The present invention will be more fully understood from the following detailed description of the embodiments thereof, taken together with the drawings in which:

DETAILED DESCRIPTION OF EMBODIMENTS

Figure 1A:
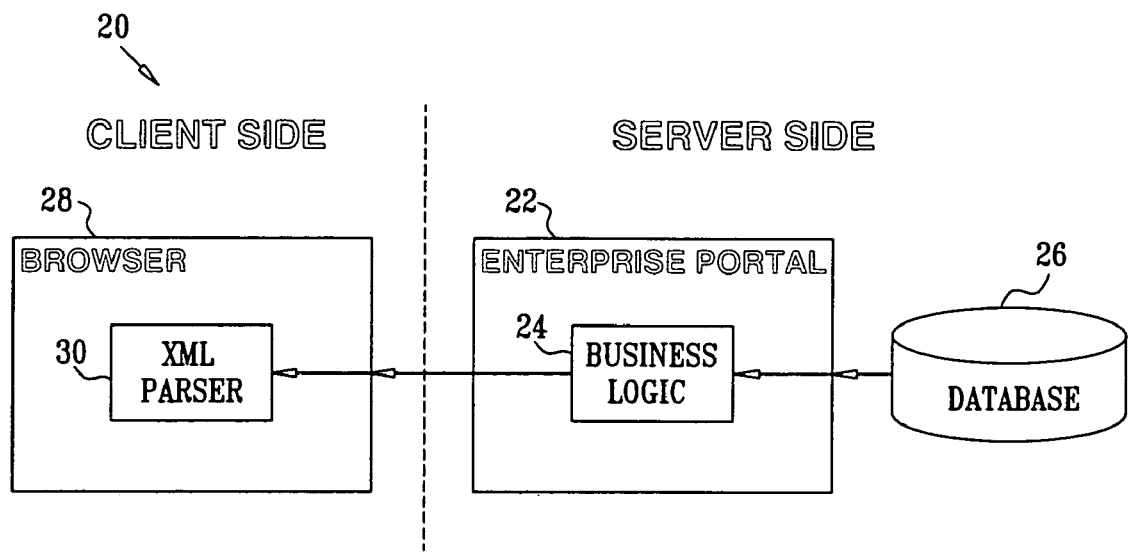
FIG. 1A is a block diagram that schematically illustrates an enterprise software system, in accordance with an embodiment of the present invention.

FIG. 1A is a block diagram that schematically illustrates an enterprise software system 20, in accordance with an embodiment of the present invention. System 20 is typically arranged in a client-server configuration, as is known in the art. The server side of system 20 comprises an enterprise portal 22 that interconnects business logic 24 and databases 26 belonging to the organization. The business logic typically prepares a body of content intended for use by the client, in the form of an XML document. The client side of system 20 comprises a browser 28, such as Microsoft Internet Explorer® or Netscape Navigator®. Browser 28 comprises an XML parser 30 that converts XML documents to a format accessible by the client. The XML document is received by the browser and passed directly to the XML parser. Typically, parser 30 converts the XML documents to the appropriate DOM.

Figure 1B:
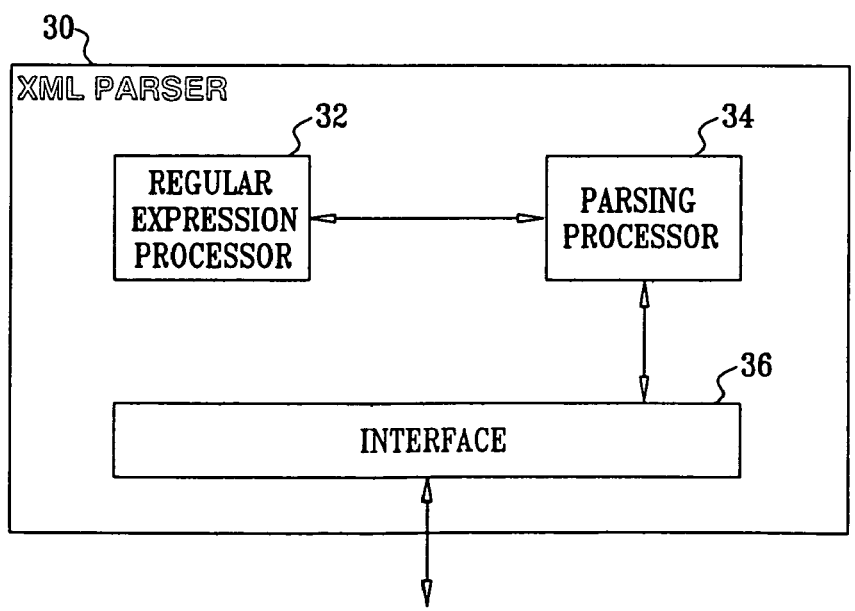
FIG. 1B is a block diagram that schematically illustrates an XML parser, in accordance with an embodiment of the present invention.

FIG. 1B is a block diagram that schematically shows details of XML parser 30, in accordance with an embodiment of the present invention. Parser 30 comprises a regular expression processor 32 that compiles nested regular expressions and converts them into self-contained regular expressions (referred to as "modified regular expressions") using methods described hereinbelow. Parser 30 further comprises a parsing processor 34, for parsing XML documents by matching the modified regular expressions to the string that the document comprises, as will be explained hereinbelow. Parser 30 further comprises an interface 36 for communicating with browser 28 and with other components of system 20.

In some embodiments, parser 30 comprises a software program written in a script language such as Javascript or VBScript. In these embodiments, the conversion of nested regular expressions to modified regular expressions is advantageous because it permits parsing processor 34 to parse target documents using standard "string match" commands provided by the script language. The XML parser can thus be implemented in a standard browser, without requiring additional application code to be downloaded and run on the client computer.

Typically, XML parser 30 is implemented using a general-purpose computer, which is programmed in software to carry out the functions described herein. The software may be downloaded to the computer in electronic form, over a network, for example, or it may alternatively be supplied to the computer on tangible media, such as CD-ROM. The parser may comprise a standalone unit, or it may alternatively be integrated with other computing functions on a single computer.

Figure 2:
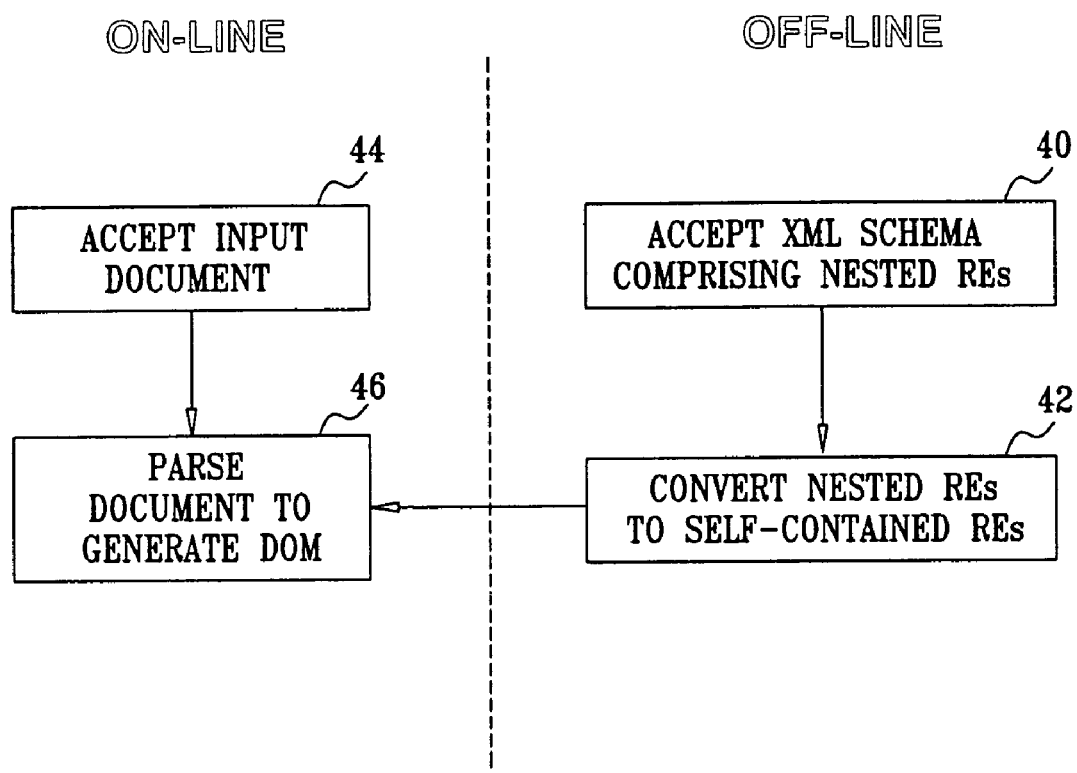
FIG. 2 is a flow chart that schematically illustrates a method for parsing XML documents, in accordance with an embodiment of the present invention.

FIG. 2 is a flow chart that schematically illustrates a method for parsing XML documents, in accordance with an embodiment of the present invention. The method can be typically divided into an off-line process and an on-line process, both carried out by XML parser 30. The off-line process comprises the conversion of XML language rules into a self-contained (non-nested) format, as will be explained below. The on-line process comprises the actual parsing of each XML document. This division of the functions of parser 30 into off-line and on-line processes is not essential, but it is convenient in the operating environment of FIG. 1A.

The off-line process begins with XML parser 30 accepting an XML schema, at a schema acceptance step 40. The XML schema comprises a set of rules and declarations, defining all valid data type and data structures of the documents to be parsed. Parsing of XML documents typically comprises verifying that the formats of all data elements in the document comply with the set of rules specified in the XML schema.

The definition of data types in the XML schema is typically given in terms of regular expressions. A data element in the document, associated with a given data type, is considered valid or compliant with the XML schema if and only if it matches the regular expression that defines the respective data type in the schema. Regular expressions in the schema typically contain nested references, i.e., references to other regular expressions. For example, consider the following set of nested regular expressions, taken from the XML 1.0 standard cited above:

Nmtoken ::=(NameChar)+
NameChar    ::=Letter|Digit|'.'|'-'|'_'|':'|CombiningChar|Extender
Letter ::= . . .
Digit ::= . . .
CombiningChar ::= . . .

The first regular expression defines the entity "Nmtoken" to be a sequence of one or more "NameChar" entities (the symbol "+" denotes one or more occurrences of the preceding expression). "NameChar" is a regular expression itself. Therefore, the definition of "Nmtoken" is a nested regular expression containing the nested reference "NameChar." The referenced regular expression is defined in the second row of the present example. "NameChar" is defined to be a single character that may comprise a letter, a digit, a combining character, an extender character or any of the symbols ".", "-", "_" or ":". The "|" symbol stands for the "or" operator. The nested references "Letter," "Digit," "CombiningChar" and "Extender" point to other regular expressions, while the remaining symbols are given explicitly.

Returning to the method of FIG. 2, RE processor 32 converts all nested regular expressions in the XML schema into self-contained regular expressions, at a conversion step 42. First, RE processor 32 replaces all nested reference names that appear in all the regular expressions of the XML schema with dedicated pointers. The pointers identify the regular expression that is referenced by each nested reference.

The pointers inserted by the RE processor have a unique format, differentiating nested reference names from other components of the regular expression. For example, the inventor has implemented an RE processor that uses pointers having the format /\$[A-Z] [A-Z_]*/. (All pointers begin with the $ character, followed by an upper-case letter, followed by any number of upper-case letters and "_" characters. The * symbol denoted zero or more occurrences of the preceding expression.) Following the notation of the present example, the previous set of regular expressions is converted to the following set of strings:

Var Nmtoken="($NAMECHAR)+";
Var NameChar="$LETTER|$DIGIT|'.'|'-'|'_'|':'|$COMBININGCHAR|$EXTENDER";
Var Letter= . . .
Var Digit= . . .
Var CombiningChar= . . .
Var Extender= . . .

Having replaced all nested references with pointers, the RE processor compiles each nested regular expression in the schema into a self-contained regular expression, thereby removing the nesting. The RE processor progressively replaces each nested reference (identified by a pointer) with its respective referenced regular expression. The compilation process continues until the modified regular expression no longer contains any nested references. Since there may be several levels of nesting (i.e., referenced REs that are nested REs themselves), several iterations may be required until the modified regular expression becomes self-contained.

For example, when compiling "Nmtoken," the first iteration converts
($NAMECHAR)+
into
($LETTER|$DIGIT|'.'|'-'|'_'|':'|$COMBININGCHAR|$EXTENDER)+

The second iteration replaces $LETTER, $DIGIT, $COMBINIGCHAR and $EXTENDER with their explicit representations (These representations are too lengthy to include in this description, but they are listed in full in the XML 1.0 standard cited above.) In this example two iterations are required to compile "Nmtoken" into a self-contained regular expression. The output of conversion step 42 is a (typically long) string comprising a self-contained modified regular expression, which is logically equivalent to the nested regular expression but does not contain any nested references.

It should be noted that the conversion method of step 42 cannot compile a recursive nested regular expression, i.e., a regular expression containing a nested reference that points to itself. Attempting to compile a recursive RE will result in an endless loop. This limitation is not a major disadvantage since recursive regular expressions are rarely used. The RE processor may verify that a given regular expression is not recursive before attempting to compile it, to avoid such endless loop.

In one embodiment, when the method is implemented using Javascript, the resulting regular expression, represented as a text string, is subsequently compiled using the Javascript RegExp "compile" method. This method converts the text string to a format usable by the Javascript RE manipulation methods such as the "match" method.

The process of conversion step 42 is repeated by RE processor 32 for each regular expression in the schema, generating a set of compiled modified regular expressions. This process produces a modified set of rules, which is logically equivalent to the XML schema, but expressed in terms of self-contained (non-nested) regular expressions.

In many practical cases, some of the nested references (and corresponding pointers) may occur several times in the same regular expression or in the same schema. To increase the computational efficiency of the compilation process, compiled regular expressions may be cached for later use. When the RE processor encounters a pointer corresponding to a previously-compiled nested reference, it may insert the cached compiled regular expression and avoid repeated compilations of the same regular expression.

The off-line process comprising steps 40 and 42 above need not be performed again for every parsed document, but may rather be performed only when an XML schema is loaded or modified, requiring a new set of modified regular expressions to be produced.

Additionally or alternatively, conversion step 42 may be invoked "on-demand" to convert a particular nested regular expression and have the resulting compiled self-contained regular expression cached for later use. XML parser 30 may, for example, perform the on-line parsing method described hereinbelow. Whenever parser 30 encounters a nested regular expression that does not have a cached, self-contained equivalent, it may instruct RE processor 32 to perform step 42 and convert the required regular expression.

The on-line process begins with XML parser 30 accepting an XML document via interface 36, at an input step 44. The document conforms to an XML specification, such as the XML 1.0 standard cited above.

Parsing processor 34 parses the document using the compiled modified regular expressions (generated previously by steps 40 and 42 of the off-line process), at a parsing step 46. XML parsing comprises validating the format and structure of all data elements in the document using the self-contained modified regular expressions that correspond to the XML schema, as described hereinabove. Having validated the compliance of the document, parsing processor 34 generates a DOM (Document Object Model), according to the XML specification cited above. For each match of one of the modified regular expressions to a sub-string within the XML document, the parsing processor generates a corresponding object and places it in the appropriate location in the DOM hierarchy. As noted above, since all regular expressions in the modified set of rules are self-contained, the parsing processor may be implemented using a computer language that does not support nested regular expressions, such as Javascript or VBScript. Finally, the DOM is delivered to browser 28 of the client via interface 36 (typically delivered to client-side software code that is also implemented using a script language such as JavaScript or VBScript).

Although the embodiments described hereinabove are concerned mainly with parsing of XML documents using Javascript, the present invention is equally applicable to other document standards and languages, as well as to other applications of string matching that use regular expressions. Such applications may be implemented using the conversion method described in conversion step 42 of FIG. 2, as will be apparent to those skilled in the art.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for string matching, comprising:
   accepting an input regular expression comprising one or more nested references to respective referenced regular expressions;
   replacing the nested references in the input regular expression with the respective referenced regular expressions, so as to provide a modified regular expression that does not contain a reference to another regular expression; and
   matching the modified regular expression to a target string.

2. The method according to claim 1, wherein replacing the nested references comprises representing the input regular expression using a character string, in which each of the nested references is represented by a pointer comprising at least one dedicated pointer character followed by a reference name.

3. The method according to claim 1, wherein replacing the nested references comprises storing a cached regular expression corresponding to a first occurrence of a nested reference, and replacing a second occurrence of the nested reference, subsequent to the first occurrence, with the cached regular expression.

4. A method for parsing a document that includes data structures conforming to a document specification, the method comprising:
   accepting a set of rules defining valid data structures in terms of a regular expression comprising one or more nested references to respective referenced regular expressions;
   replacing the nested references in the regular expression with the respective referenced regular expressions, so as to provide a modified regular expression that does not contain a reference to another regular expression and so as to provide a modified set of rules comprising the modified regular expression; and
   parsing the document using the modified regular expression that does not contain a reference to another regular expression and accordingly to the modified set of rules.

5. The method according to claim 4, wherein parsing the document comprises producing a document object model (DOM) corresponding to the document.

6. The method according to claim 4, wherein the document specification comprises an Extensible Markup Language (XML) specification.

7. The method according to claim 4, wherein parsing the document comprises applying to the document a parsing program written in a script language.

8. Apparatus for string matching, comprising:
   an interface, which is arranged to accept an input regular expression comprising one or more nested references to respective referenced regular expressions;
   a regular expression processor, which is arranged to replace the nested references in the input regular expression with the respective referenced regular expressions, so as to provide a modified regular expression that does not contain a reference to another regular expression; and
   a parsing processor, which is arranged to match the modified regular expression to a target string.

9. The apparatus according to claim 8, wherein the regular expression processor is arranged to represent the input regular expression using a character string, in which each of the nested references is represented by a pointer comprising at least one dedicated pointer character followed by a reference name.

10. The apparatus according to claim 8, wherein the regular expression processor is arranged to store a cached regular expression corresponding to a first occurrence of a nested reference, and to replace a second occurrence of the nested reference, subsequent to the first occurrence, with the cached regular expression.

11. Apparatus for parsing a document that includes data structures conforming to a document specification, the apparatus comprising:
    an interface, which is arranged to accept a set of rules defining valid data structures in terms of a regular expression comprising one or more nested references to respective referenced regular expressions;
    a regular expression processor, which is arranged to replace the nested references in the regular expression with the respective referenced regular expressions, so as to provide a modified regular expression that does not contain a reference to another regular expression and so as to provide a modified set of rules comprising the modified regular expression; and
    a parsing processor, which is arranged to parse the document using the modified regular expression that does not contain a reference to another regular expression and accordingly to the modified set of rules.

12. The apparatus according to claim 11, wherein the parsing processor is arranged to produce a document object model (DOM) corresponding to the document.

13. The apparatus according to claim 11, wherein the document specification comprises an Extensible Markup Language (XML) specification.

14. The apparatus according to claim 11, wherein the parsing processor is arranged to apply to the document a parsing program written in a script language.

15. A computer software product for string matching, the product comprising a computer-readable medium in which program instructions are stored, which instructions, when read by a computer, cause the computer to accept an input regular expression comprising one or more nested references to respective referenced regular expressions, to replace the nested references in the input regular expression with the respective referenced regular expressions, so as to provide a modified regular expression that does not contain a reference to another regular expression, and to match the modified regular expression to a target string.

16. The product according to claim 15, wherein the instructions cause the computer to represent the input regular expression using a character string, in which each of the nested references is represented by a pointer comprising at least one dedicated pointer character followed by a reference name.

17. The product according to claim 15, wherein the instructions cause the computer to store a cached regular expression corresponding to a first occurrence of a nested reference, and to replace a second occurrence of the nested reference, subsequent to the first occurrence, with the cached regular expression.

18. A computer software product for parsing a document that includes data structures conforming to a document specification, the product comprising a computer-readable medium in which program instructions are stored, which instructions, when read by a computer, cause the computer to accept a set of rules defining valid data structures in terms of a regular expression comprising one or more nested references to respective referenced regular expressions, to replace the nested references in the regular expression with the respective referenced regular expressions, so as to provide a modified regular expression that does not contain a reference to another regular expression and so as to provide a modified set of rules comprising the modified regular expression, and to parse the document using the modified regular expression that does not contain a reference to another regular expression and accordingly to the modified set of rules.

19. The product according to claim 18, wherein the instructions cause the computer to produce a document object model (DOM) corresponding to the document.

20. The product according to claim 18, wherein the document specification comprises an Extensible Markup Language (XML) specification.

21. The product according to claim 18, wherein the instructions that cause the computer to parse the document are written in a script language.

* * * * *